US005404523A

United States Patent [19]
DellaFera et al.

[11] Patent Number: 5,404,523
[45] Date of Patent: Apr. 4, 1995

[54] METHOD OF MANAGING REQUESTS IN A TRANSACTION PROCESSING SYSTEM

[75] Inventors: Ciaran A. DellaFera; Yun-Ping Hsu, both of Hudson, Mass.

[73] Assignee: Digital Equipment Corporation, Maynard, Mass.

[21] Appl. No.: 150,377

[22] Filed: Nov. 10, 1993

[51] Int. Cl.⁶ .............................................. G06F 15/20
[52] U.S. Cl. ................................................... 395/650
[58] Field of Search ................................. 395/650, 700

[56] References Cited

U.S. PATENT DOCUMENTS 5,021,949  6/1991  Morten et al. ................. 364/DIG. 1
5,187,787  2/1993  Skeen et al. ................... 364/DIG. 1
5,247,670  9/1993  Matsunaga ........................... 395/650

Primary Examiner—Thomas M. Heckler
Attorney, Agent, or Firm—Barry N. Young; Arthur W. Fisher

[57] ABSTRACT

A novel method and apparatus for managing user requests throughout a distributed processing system permits the tracking and managing of a request as it propagates throughout a transaction processing (TP) system; and provides a method and mechanism for communication between an end-user client and any server working as a result of the end-user client's initial request.

17 Claims, 1 Drawing Sheet

METHOD OF MANAGING REQUESTS IN A TRANSACTION PROCESSING SYSTEM

BACKGROUND OF THE INVENTION

1.1 The Field of Distributed Processing

Generally, the invention applies to the field of distributed processing and multi-processing or multi-tasking computer environments. Specific embodiments of the invention are contemplated in a transaction processing system operating under the Distributed Computing Environment (DCE)

1.2 The TP System

As a concept, the phrase "TP system" i.e., transaction processing (TP) system is used to describe a collection of nodes or computer systems that are cooperating to form one or more business functions such as check processing or retail point of sale processing. For example, there may be one TP system that performs multiple business functions, or there may be multiple TP systems cooperating to perform one business function. Practically, the term TP system indicates a collection of computers with a unified purpose.

The present invention comprises methods and mechanisms for use in a TP system. The invention is used, along with other products, to manage and operate a collection of computers (ie. a TP system) as an entity.

1.3. RPCs in the DCE

While the present invention may be applied to any collection of cooperating computers, it was developed as a product for the Distributed Computing Environment (DCE). The DCE is a standard for distributed computing that is proffered by the Open Software Foundation. It is described in a useful reference work written by three employees of the assignee of this invention: "Understanding DCE," by Ward Rosenberry, David Kenney, and Gerry Fisher (Sebastopol, Calif.: O'Reilly & Associates, Inc. 1992), hereinafter referred to as [RKF], which is incorporated by reference as background information well-known to those of ordinary skill.

In the DCE environment, service requests may be transmitted as "remote procedure calls" (RPCs) that conform to a standard specification. RPCs permit standardized communication among nonidentical and even nonstandard components in a DCE network.

A special category of program instructions in the DCE environment is referred to as "stub code." Generally speaking, stub code comprises standard program instructions that act as a communications interface between a main program (either a client program or a server program) and one or more remote processes. See generally [RKF] sections 3.1.2 and 3.5.

(Those of ordinary skill having the benefit of this disclosure will of course recognize that descriptions of program code performing a particular function, e.g., stub code "acting" as a communications interface, are in fact convenient and conventional shorthand references to the operation of one or more processors executing instructions comprising the program code.)

1.4 Clients and Servers

The term "server" is commonly used to refer to a computer program, executing on a appropriate processor system ("server host"), that carries out service requests made by, e.g., other computer programs that may be executing on the same or other computer systems. In most implementations a server executes on a specified computer and receives service requests from other computers over a communications network. See generally [RKF] at section 1.2.

More specifically, an RPC "server" is commonly defined as a "process" that "exports" one or more "interfaces" capable of being invoked by remote clients. (Generally, an "interface" is a formal specification of inputs and outputs for a specified service. See generally [RKF] section 9.3.) A "process" refers generally to the execution by a physical processor (or processor system) of one or more series of instructions in a specified "address space," i.e. a system environment that includes particular physical resource allocations, open files, static data, etc.

The term "client" is commonly used to refer to a computer program, executing on an appropriate processor system ("client host"), that issues service requests that are carried out by "servers." As a request propagates through a TP system, a participating process may be both a server and a client. For example, a request may proceed from its original source to server 1. If server 1 requires assistance to service the request, it may forward the request (or a new request) to server 2 and so on. Each separate request defines a different client to server relationship. The original source of a request is the end-user client; server 1 is a server to the end-user and a client to the server 2 and so on.

1.5 The End-User Client

Referring to FIG. 2, generally, each service being performed in a TP system can be attributed to an ultimate or end-user client (202). More specifically, generally, there is a process (the end-user client (202)) that initiates a task by sending out a "request (204)." Many other processes may become involved in order to fulfill the request. These other processes can be servers, clients or both. However, generally, there is only one end-user client (202) for a specific task. It is the client that initiates the chain of events by sending out a "request (204)."

1.6 The Difficulties of Tracking and Managing Requests in a TP System

The tracking, managing and debugging of end-user requests is extremely difficult in an RPC based distributed system. This is because the resolution of a single request may involve execution by many different processes (206, 211, etc.) on many different hosts (205, 208, etc). More specifically, under the current art, it is difficult and there is no standard way to know what processes, servers or resources of any kind, work on a particular request. Also, there is no standard, uncomplicated way to get intermediate results back to the end-user without collapsing the chain of RPCs. For example, there is no uncomplicated way to tell the end-user that a result is delayed because of a down-line server.

SUMMARY OF THE INVENTION

The invention provides a method and apparatus for uniquely identifying, tracking and managing end-user requests as they propagate throughout a TP system. In addition, the invention provides a method and apparatus that allows a server in the path of execution of the end-user request to access the standard input and output (stdio) operations on the stdio streams of the end-user client.

Referring to FIG. 2, the invention contemplates that an RPC (212), issued by an end-user (202), is the initiation of a request. The request has a path of execution that flows from the end-user client (202) to one or more servers (206, 211, etc.) and then back to the end-user client (202). The path of execution is discrete, involving only those servers that receive an RPC which can be traced back to the RPC that began the request at the end-user client.

Generally, requests are managed via the invention by creating a unique tag for each request and propagating the tag with the request. A manager process (207 or 209), local to each involved server, records information about a request as it passes through. The records retained by the local managers (207, 209) may be used for management, tracking and debugging. A more detailed management can be achieved by propagating more information with an end-user request. For example, one embodiment of the invention contemplates the propagation of the entire request-context.

Additionally, the invention provides a communication mechanism between a server and the requesting end-user client. The mechanism is achieved by: 1) the end-user client registering an interface before sending a request; 2) propagating, along with a request, the address of the registered interface; 3) replacing the definitions, in the server's standard input and output(I/O)library with definitions that direct RPCs back to the end-user client's standard I/O library (via the interface established at step 1).

DETAILED DESCRIPTION OF SPECIFIC EMBODIMENTS

Figure 1:
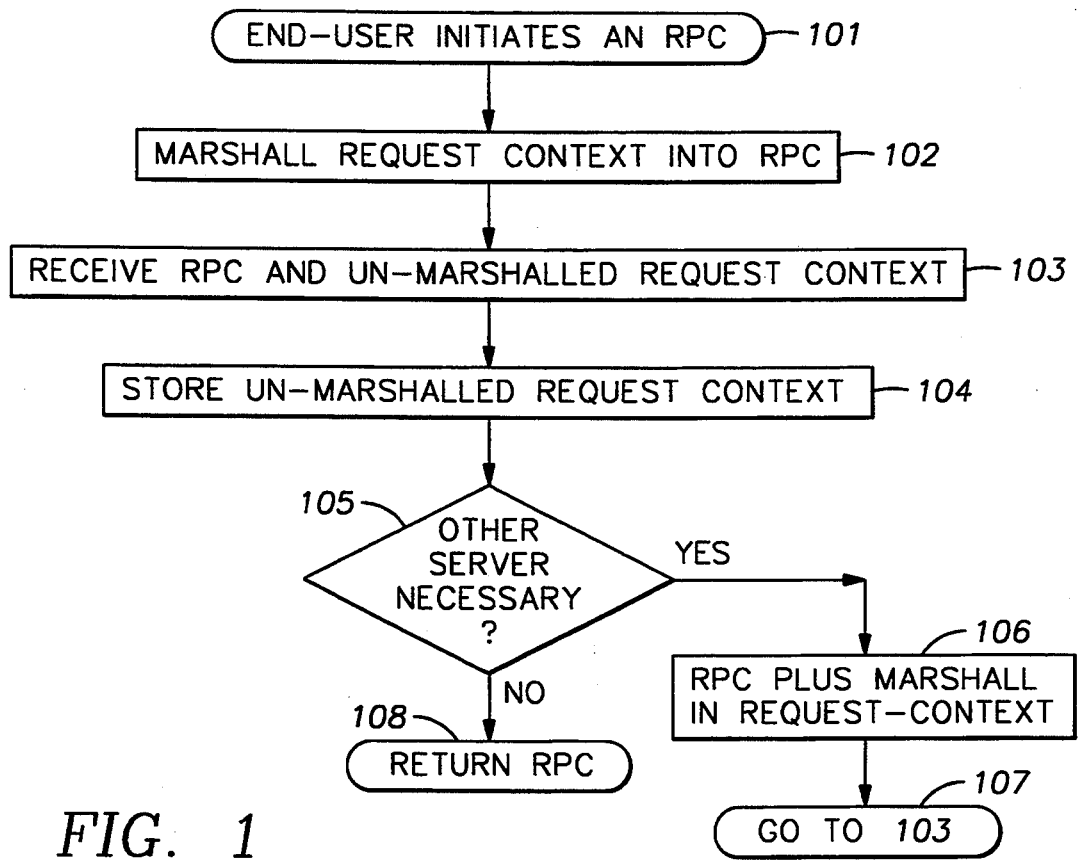
FIG. 1 shows an implementation of a method in accordance with the invention.

4.1 "Context" as Contemplated by the Invention.

As stated above, the invention contemplates an end-user client (end-user) that sends out a "request." The request is associated with a "context." Generally, there are two types of contexts associated with a request. First, there is the "transaction context." Here the word "transaction" is used in a literal sense. The transaction context contains information indicating the specific transaction that requires the current operations. If the operations are under transaction control then the transaction context indicates the specific transaction that the current operations occur under.

The second context is called "request-context." The request-context is a data structure. Generally, the request-context embodies information about the environment in which the end-user made the request. The invention contemplates that the request-context comprises at least one data item to implement basic request management and/or I/O mechanisms. In accordance with the invention, at least two particular data items are relevant: 1) the request-id; and 2) the request-stdio-binding.

Other information that may be contained in the request-context includes: 1) the end-user system's identification and primary associated I/O device; 2) the natural language of the end-user; 3) the principal of the user (or user name of a human on the system); 4) the authentication credentials of the end-user; and 5) the request-context unique user identifier (UUID) which provides version control (see discussion of UUID in next section). Furthermore, if the request is a queued request it might also include: 6) submission information which includes information necessary to say when, how and where this request was submitted (submit time, submit TP system name, submit task group which is analogous to DCE interface); 7) server task information which contains information about the particular task in the server that will be invoked by this request; and 8) trigger information which is used if the queued request is intended to be processed at a latter time).

Generally, the purpose for propagating all of this other information is so that a down-line server (a machine down the line that will be processing that request) can execute the request in the proper context. This allows the results of the processing to come out in the right language, to the right I/O device, with the right credentials, etc.

4.2 The Request-id

Generally, the request-id is an identification tag for a specific request. In one embodiment of the present invention, the request-id is a DCE RPC "universally unique identifier" (UUID) that is created for and assigned to the originating request, generally any request from an end-user client. (For a discussion of UUIDs, see [RKF] at pgs. 45, 120, 137 and 214.) As the name indicates, generally the request-id universally and uniquely identifies a specific request.

4.3 The Request-stdio-binding

Qualitatively, the request-stdio-binding is the address of the end-user's I/O device. Physically, it is a string or character array that contains a DCE RPC string binding. (For a discussion of "string bindings," see [RKF] at pg. 131.) The request-stdio-binding specifically identifies a DCE RPC interface that can provide access; to the stdio streams of the end-user client. Conventionally and in the DCE implementation of the invention, the stdio streams of the end-user make all standard C stdio operations available.

In one embodiment, this request-stdio-binding is sent in a structure called "display information" which contains "display," "display device," "display TP system," "display binding," and "backchannel binding." The "display" is a pointer (similar to a name) to a particular identifiable display. "Display device" is the actual physical device on a particular system. "Display TP system" is the name of the system on which that physical device resides. The "display binding" is the DCE RPC string binding of the interface to the end-user client's display manager (e.g., forms management package). Finally, "backchannel binding," which is the last item in that structure, is the request-stdio-binding.

4.4 The Request Manager

Figure 2:
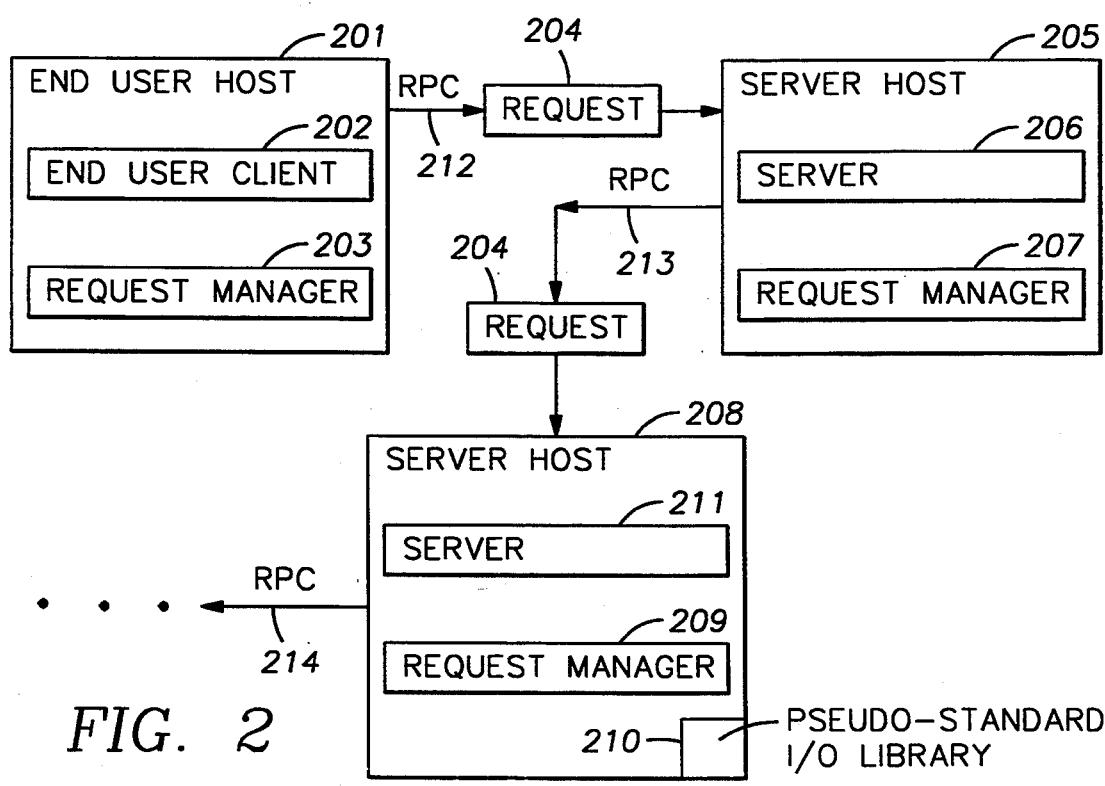
FIG. 2 is an example of a TP system.

Referring to FIG. 2, the invention contemplates a registration authority called a "request manager" (203, 207 or 209). Generally, the request manager (203, 207 or 209) keeps track of local active requests. Ideally, the request manager (207, 209) keeps track of all currently active requests made by any local client. For example, ideally, the request manager (203) tracks the requests made by end-user (202) and any requests made by other processes in fulfilling the end-users' requests. In accordance with the invention, the request manager (203)

will only monitor and track local requests. In one embodiment, "local" means located on the same host computer (201, 205 or 208). However, depending upon the scale and implementation of a particular TP system, "local" could mean for discretely defined group of hosts or portion of a single host.

A request manager's responsibilities may be described with reference to the sending or receiving of an RPC. When an RPC (204) is sent, the request manager (203) local to the sending client records: 1) the request-id; 2) the request context; and 3) the requesting client (specifically noting if it is an end-user client).

When an RPC (204) is received, the request manager (207) local to the receiving server (206) records: 1) the request-id; 2) the request context; and 3) the server processing the request. In one implementation, whenever a request manager receives a request without a request-id (i.e., with a NULL request-id) it assumes that it is being asked to become the originating request manager for that request. The now-originating request manager is responsible for generating a request-id and any initial request context for the newly created request. On the other hand, if a request manager receives a fully-formed request (i.e., one with a non-NULL request-id and properly formatted request context) it assumes that it is a participating request manager involved in processing the request and not the originator.

Each request manager maintains a list or index of all the data it has gathered. Specifically, lists are maintained for: 1) all requests made; 2) the client or server on which the request executed; 3) the associated request-context. This data maintained by the request managers may be accessed and manipulated by defining and using an appropriate interface. The data can be accessed at any time in order track and manage requests.

4.5 Request-Context Propagation

At least one embodiment of the invention contemplates that the request-context is propagated with a request, throughout the path of execution. The invention provides for the propagation of request-context through the method shown in FIG. 1.

Referring to FIG. 1, block 101 shows the first step of the method: the end-user client creates the request-context and issues an RPC. Only the end-user creates request-context. All other clients and servers simply pass it along.

Control automatically shifts to block 102 where the request-context is marshalled into the call. In one embodiment of the invention this is accomplished by calling a special marshalling routine upon the issuance of an RPC by the end-user client. In one embodiment of the invention, the request-context is passed as a "hidden argument." Of course the argument may alternatively be explicit. See section 4.6.

Control automatically passes to block 103 where the RPC is received by a server and the request-context is un-marshalled. This allows the server to examine the request-context before processing. In one embodiment of the invention, the un-marshalling is accomplished by calling a special un-marshalling routine. At this time, any necessary work is accomplished to re-establish the context in which the request was originally made (for example: setting privileges, acquiring resources, etc.).

Control automatically passes to block 104 where the un-marshalled request-context is stored and passed along. More specifically, the request-context is stored in the server's thread context and a copy is passed to the server's local request manager.

Control automatically passes to decision block 105 where it is determined if the server has fully serviced its current request (the request sent from its client) or if the server requires assistance from another server. If the server requires assistance then control passes to block 106 where an RPC is issued and the request-context is pulled from the server's context thread and marshalled into the outgoing call. In one embodiment, a marshalling routine is called when the RPC is issued; the marshalling routine pulls the request-context from the server's context thread and marshals it into the RPC.

From block 106, control automatically passes to block 107 where control is automatically passed to block 103. At block 103, a new server receives the new RPC and the process proceeds as described above. Moving back to decision block 105, if the server completes service of the current request then control passes to block 108. At block 108, the RPC call chain unwinds and begins to return to the end-user client. Furthermore, the local request manager is alerted so that it may note that the local server is no longer participating in the request.

In one embodiment, a special marshalling routine is called when the RPC returns; the marshalling routine pulls the context from the server's context thread and marshals it into the response.

4.6 Hidden and Explicit Arguments.

When a call is defined to DCE, generally, the interface is defined for the RPC. This definition specifies the types of arguments that are included in the RPC. For example, it might specify "name" as a type of character string or "age" as a type of integer.

The invention contemplates the use of a "hidden argument." Like an integer or character string, a hidden argument is specified as a type of argument. However, unlike integer or character string, DCE does not automatically know what hidden argument is. Therefore, when DCE marshals the data and examines an interface definition that includes a hidden argument, it calls a special marshalling routine (a hidden argument marshalling routine). The hidden argument marshalling routine then proceeds to find and appropriately place the hidden argument data.

The difference between hidden and explicit arguments is simply the definition in the "type" field (that is hidden arguments are hidden and not explicitly named at call time). DCE knows the explicit arguments and can marshall them without assistance. When a hidden argument is detected, DCE knows to call the special marshalling routine. The routine to be called depends upon the type of hidden argument.

4.7 Using the Request-stdio-binding as a Back Channel

The request-stdio-binding enables a back channel mechanism for communication from any point in the execution path of a request back to the end-user. Referring to FIG. 2, in one embodiment, the back channel is implemented by substituting a pseudo standard I/O library (pseudo stdiolib) (210) for the normal standard I/O library used by the current server (211). The pseudo stdiolib re-directs the standard I/O calls of the server (211) into an RPC call back to the end-user (202). When the server is built, the default standard I/O routines are replaced by a special standard I/O library that contains directives to make RPC calls back to the standard I/O streams of the end-user client. For example, when the server executes printf, it accesses the standard I/O library definition of printf. Note that an RPC Standard I/O handler is something that receives a standard I/O request and executes it using RPC calls as directed by the pseudo-stdiolib.

The end-user client must have a receiving mechanism in order to be receptive to standard I/O commands from a distant server. Therefore, before an end-user ever initiates a request, it must register an interface or otherwise make arrangements to receive RPC messages. In one embodiment, this is accomplished when the end-user client initializes. At that time, the end-user registers an interface with the RPC runtime along with a set of acceptable routines (the pseudo-standard I/O library "receivers"). RPC runtime returns a string binding to the end-user. It is this string binding that is used as the request-stdio-binding.

4.8 An Illustrative Example

Consider an imaginary travel reservation system as an illustrative example of server and client cooperation. Suppose that a travel agent uses a terminal and a computer that runs the end-user client process. Suppose the ticket agent wishes to make reservations for Ms. Passenger: 1) to fly round trip from Boston to Chicago; 2) to stay at the Scarriot Hotel in downtown Chicago for 3 nights; and 3) to rent a Dertz car for 4 days.

Through ordinary means, the travel agent initiates this request by interacting with an application program (end-user client) on her host computer. By beginning a new itinerary, she initiates the a new request for Ms. Passenger. All work done for Ms. Passenger will now become part of this request.

Dealing first with the flight: suppose that flight schedules can be obtained from LABER, a national airline reservation service. The travel agent selects the airline reservation option on the itinerary. Her end-user client then makes an RPC call to a server that has access to the LABER nation wide database. This server has now become a participant in the request that the travel agent initiated when she began the itinerary. As the server begins to retrieve information from the LABER database it enters into a dialogue with the end-use client's forms management package to display flight information forms and retrieve passenger preferences.

Once Ms. Passenger's plane reservations are essentially complete (but not yet finalized) the travel agent now moves on to the hotel. The travel agent selects the hotel reservation option on the itinerary and her end-user client then makes another RPC call to the travel agency server that manages hotel reservations.

Suppose that as it turns out, the Scarriot uses a system that is interoperable with the travel agency's system. In this situation the travel agency's hotel server makes another RPC call directly to the Scarriot Hotel's reservation server. Throughout the entire process all interoperable servers are active participants in the original request.

When the RPC call arrives at the Scarriot Hotel's server it is necessary to establish the travel agent's credentials so that the Scarriot Hotel's server will know that the travel agent is one of the authorized users of the Scarriot Hotel's reservation server. This can be done quite easily since the all interoperable servers are full participants in the request. (That in turn means that all the necessary authorization, privilege information, and other "contextual information" about the travel agent executing the request has been brought along to each server participating in the request.)

Once the agent's credentials have been validated (and the fact that her request contained a "hotel manager's preferred list" membership number was noted) the RPC is immediately processed and the Scarriot hotel's server begins its own dialogue with the end-user client's forms management package to provide information on room rates and a reservation form.

Lastly, the travel agent selects the car reservation option on the itinerary. As she is waiting for the travel agency's car reservation server to connect to Dertz's nationwide car reservation database a red message flashes on the top of her screen "WARNING—Airfare rates changing in 15 minutes, transactions not complete by then will be unable to lock in the current rate." The LABER system has been holding the agent's airline reservation, waiting for the completion of the itinerary. It has taken advantage of a priority back channel to the travel agent's display in order to warn the travel agent, even while the end-user client's forms management package is waiting for the Dertz server to respond.

At this point the travel agent selects the outstanding request status item from the itinerary menu. Her end-user client then sends out the necessary RPC calls to find out the status of her request on the car reservation server. Since her request on the car reservation server and on all other participating servers is tagged with a unique request identifier the end-user client quickly receives status reports from the request managers of all the participating servers. The end-user client packages this into a complete request status display. (This is the request-id being used for request management). Reviewing the results the travel agent sees that the airline reservation and the hotel reservation are pending final approval (with a red flag on the airline reservation indicating that a high priority message was received from that server) and that the car reservation server is waiting for a reply from the 3 Dertz servers it had to contact.

Seeing this she tells Ms. Passenger that the Dertz systems are running very slowly and would she mind a car from Mavis (which has servers that are interoperable with the travel agency's systems and therefore much faster). She also notes that this would allow her to lock in the airline rates before they change in 15 minutes. Ms. Passenger agrees so the travel agent aborts the Dertz request which cancels the three outstanding RPCs to the 3 Dertz servers. Traveling quickly through the car reservation process with the Mavis server the travel agent informs Ms. Passenger that everything is set. They agree that they are both satisfied with the results and the travel agent selects the "commit itinerary" item from the itinerary menu. A separate request to mail the itinerary and bill to Ms. Passenger is enqueued and all the participating servers are informed that they should commit the outstanding work for the request and the results are returned to the travel agent's end-user client as each server commits its work.

When the final results are in the end-user client informs the travel agent that Ms. Passenger's request has been completed, and that a new request to mail the itinerary and bill have been enqueued. The travel agent gives Ms. Passenger the request-id of the enqueued request so that she can follow up if she doesn't receive the itinerary and bill within 15 days. They say their goodbyes and hang up.

The travel agent, still a little miffed at Dertz calls up the Dertz data processing center and complains about her request taking too long. The Dertz computer operator checks the master log using the request-id of Ms. Passenger's initial request. (The travel agent's end-user client logged this information for future reference). Checking his logs the computer operator sees that the request was aborted while it was waiting for the O'Hare Dertz server to respond. Looking at the O'Hare Dertz server's logs, he can see that Ms. Passenger's request was held up because the "compact car" database, at O'Hare was accidently taken off line. (Information available through request manager). Apologizing for the inconvenience the computer operator takes note of the information and agrees to provide the travel agency with additional free access time in return.

4.9 Standard Software

The invention described herein could apply in other environments as well. The current implementation of this invention runs on VAX VMS 5.5-2; Ultrix 4.2; and OSF/1.

4.10 Specialized Software

In the interest of clarity, not all features of an actual implementation are described in this specification. It will of course be appreciated that in the development of any such actual implementation (as in any software development project), numerous programming decisions must be made to achieve the developers' specific goals and sub-goals (e.g., compliance with system- and business-related constraints), which will vary from one implementation to another. Moreover, attention will necessarily be paid to, e.g., proper serialization to handle concurrent events. It will be appreciated that such a development effort might be complex and time-consuming, but would nevertheless be a routine undertaking of program development for those of ordinary skill having the benefit of this disclosure.

4.11 Non-Limitation

It will be appreciated by those of ordinary skill having the benefit of this disclosure that numerous variations from the foregoing illustration will be possible without departing from the inventive concept described herein. For example, those of ordinary skill having the benefit of this disclosure will recognize that logical functions described above as being implemented in software can equivalently be implemented in hardware, e.g., through the use of discrete logic circuitry, and vice versa; likewise, a general-purpose processor operating under program control could equivalently be replaced by one or more special-purpose chips designed to perform the programmed functions; and so forth.

Accordingly, it is the claims set forth below, and not merely the foregoing illustration, which are intended to define the exclusive rights claimed in this application.

What is claimed is:

1. A method executed by a server to track and manage requests in a transaction processing system that comprises an initial client issuing an end-user request for an end-user processing operation, a final server which performs the end-user processing operation, and an intermediate server which propagates the end-user request to the final server, the method comprising:

receiving, by said intermediate server, a client request and a tag identifying said end-user request, said client request belonging to a chain of one or more client requests originating from said end-user request;

recording, on said intermediate server, client request information comprising a first specified portion of said tag used to track and to manage requests in said transaction processing system;

issuing, performed by said intermediate server in response to said client request, a subsequent client request to another server, said subsequent client request including a second specified portion of said tag used to track and manage requests in said transaction processing system; and performing said end-user processing operation on said final server to complete said end-user request in response to a client request which belongs to said chain of client requests.

2. The method of claim 1, wherein said tag comprises request-context information about a system environment of said end-user request.

3. The method of claim 2, wherein said request context information includes one of a system identifier identifying the computer system of said end-user request, or an input and output device used in processing said end-user request.

4. The method of claim 1 wherein said first and second specified portions of said tag each comprise a unique identifier distinguishing said end-user request.

5. The method of claim 1, wherein said recording is done by a request manager.

6. The method of claim 1 further comprising accessing said client request information from said recording step.

7. The method of claim 1 wherein said subsequent client request is issued to another intermediate server, and the method further comprises updating, by said intermediate server, said client request information to reflect the issuing of said subsequent client request.

8. The method of claim 1, wherein said subsequent client request is issued to said final server, and the method further comprises returning to said intermediate server, and updating said client request information to reflect the results of said processing operation.

9. A method of handling a request signal generated while processing, on a server computer, an end-user request that originates from an end-user client, said request signal being uniquely associated with said end-user client, said end-user request comprising a string binding that contains information identifying an input and output device of said end-user client, said method executed by said server computer in a transaction processing system, the method comprising:

a) receiving said request signal, said request signal comprising a predetermined input and output signal that is directed to an input and output device of said end-user client;

b) creating a server process including an input and output handler to process said request signal by using a remote procedure call and said string binding to send said request signal directly back to said end-user client.

10. The method of claim 9, wherein said input and output handler uses an input and output library containing said remote procedure call.

11. The method of claim 9 further comprising performing an input and output operation with said server process; and receiving said input and output operation by said end-user client.

12. An apparatus in a client-server communication system, said communication system comprising an end-user client issuing a service request for a service processing operation and having a plurality of input and output devices that respond to predetermined input and output signals, and a plurality of servers including a final server and at least one intermediate server, said final server performing the service processing operation and each intermediate server propagating the service request to the final server, said apparatus comprising:
- means for receiving in a first one of said plurality of servers said service request issuing from said end-user client using a remote procedure call;
- means for propagating said service request to another one of said servers if said first server is an intermediate server;
- means for performing said service processing operation if said server is said final server;
- means for producing one of said predetermined input and output signals while performing said service processing operation or while propagating said service request, said predetermined input and output signal being directed to one of said input and output devices of said end-user client; and
- means for sending said input and output signal directly back to said end-user client.

13. The apparatus of claim 12 further comprising means for receiving on said end-user client information from said server, said information receiving means using a programming interface that has been registered on said end-user client and that indicates that said input and output signal is directed to said end-user client when said input and output signal is transmitted from one of said servers using the programming interface.

14. The apparatus of claim 12, wherein said means for sending said input and output signal comprises a version of a standard input and output library which is used to send the input and output signal from said server directly back to said end-user client using a remote procedure call.

15. The apparatus of claim 12, wherein said service request comprises a string binding containing information used by said server to direct said input and output signal to one of said input and output devices of said end-user client.

16. The apparatus of claim 12, wherein said service request comprises a tag uniquely identifying said service request from other service requests.

17. The apparatus of claim 12, wherein said means for sending said input and output signal comprises a remote procedure call from said server to said end-user client.

* * * * *